(12) United States Patent
Pierfelice

(10) Patent No.: US 9,817,631 B2
(45) Date of Patent: Nov. 14, 2017

(54) CONTROL OF VEHICLE INTERIOR SOUND LEVELS BASED ON VEHICLE LOCATION

(71) Applicant: Toyota Motor Engineering & Manufacturing North America, Inc., Erlanger, KY (US)

(72) Inventor: Jeffrey E. Pierfelice, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 34 days.

(21) Appl. No.: 14/990,045

(22) Filed: Jan. 7, 2016

(65) Prior Publication Data

US 2017/0199717 A1 Jul. 13, 2017

(51) Int. Cl.
| | | |
|---|---|---|
| *G06F 3/00* | (2006.01) | |
| *H04R 3/00* | (2006.01) | |
| *G06F 3/16* | (2006.01) | |
| *G01C 21/34* | (2006.01) | |
| *B60K 35/00* | (2006.01) | |

(52) U.S. Cl.
CPC .............. *G06F 3/165* (2013.01); *B60K 35/00* (2013.01); *G01C 21/3461* (2013.01); *B60K 2350/35* (2013.01)

(58) Field of Classification Search
CPC ..... G06F 3/165; B60K 2350/35; B60K 35/00; G01C 21/3461
See application file for complete search history.

(56) References Cited

U.S. PATENT DOCUMENTS

| | | | |
|---|---|---|---|
| 4,342,023 | A | 7/1982 | Tsunoda et al. |
| 5,483,692 | A | 1/1996 | Person et al. |
| 5,530,761 | A | 6/1996 | d'Alayer de Costemore d'Arc |
| 7,170,419 | B2 | 1/2007 | Masui |
| 2008/0243373 | A1 | 10/2008 | Cat et al. |
| 2012/0269358 | A1* | 10/2012 | Gee ...................... G10K 11/178 381/71.4 |

\* cited by examiner

*Primary Examiner* — Muhammad N Edun
(74) *Attorney, Agent, or Firm* — Christopher G. Darrow; Darrow Mustafa PC

(57) ABSTRACT

A computing device for a vehicle interior sound control system is described. The device includes one or more processors for controlling operation of the computing device, and a memory for storing data and program instructions usable by the one or more processors. The one or more processors are configured to execute instructions stored in the memory to operate, responsive to a location of the vehicle, at least one portion of the vehicle so as to control a sound level in an interior of the vehicle produced by the at least one portion of the vehicle.

16 Claims, 4 Drawing Sheets

CONTROL OF VEHICLE INTERIOR SOUND LEVELS BASED ON VEHICLE LOCATION

TECHNICAL FIELD

Aspects of the disclosure generally relate to systems and methods for controlling the level or volume of sound generated by vehicle systems and components.

BACKGROUND

Vehicle systems and components may generate a variety of sounds. Some sounds may be directed to (or heard mainly within) the vehicle occupant/passenger compartment (i.e., in the vehicle interior), while other sounds are heard clearly primarily outside the occupant compartment, especially when the windows are up and the doors are closed. The volume of some sounds heard within the occupant compartment may become distracting or irritating to the driver and/or passengers. This may divert the occupants' attention from sounds or other events occurring exterior of the vehicle. Thus, it would be beneficial to have a system for automatically controlling vehicle interior sounds in certain situations where it is important or desirable to clearly and promptly hear sounds occurring outside the vehicle.

SUMMARY OF THE INVENTION

In one aspect of the embodiments described herein, a computing device for a vehicle interior sound control system is provided. The device includes one or more processors for controlling operation of the computing device, and a memory for storing data and program instructions usable by the one or more processors. The one or more processors are configured to execute instructions stored in the memory to operate, responsive to a location of the vehicle, at least one portion of the vehicle so as to control a sound level in an interior of the vehicle produced by the at least one portion of the vehicle.

In another aspect of the embodiments described herein, a computing device for a vehicle interior sound control system is provided. The computing device includes one or more processors for controlling operation of the computing device, and a memory for storing data and program instructions usable by the one or more processors. The one or more processors are configured to execute instructions stored in the memory to operate, responsive to a location of the vehicle, at least one of a vehicle media device, a blower and an HMI so as to control a sound level produced by the vehicle media device, blower and HMI.

DETAILED DESCRIPTION

The present disclosure describes embodiments of a vehicle interior sound control system. The system is configured for controlling various vehicle systems and/or components which generate sounds heard inside the vehicle occupant compartment. Examples of such systems and/or components include the blower(s) used for the HVAC system, the car stereo, video devices such as DVD players, any human-vehicle audio interfaces, and any other vehicle-generated sources of sounds heard in the occupant compartment. The system is configured to automatically control these vehicle interior sounds when the vehicle is at "quiet locations" (i.e., geographical locations where it is deemed desirable to reduce the volume(s) of vehicle-generated sounds within the vehicle occupant compartment, or to eliminate such sounds).

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
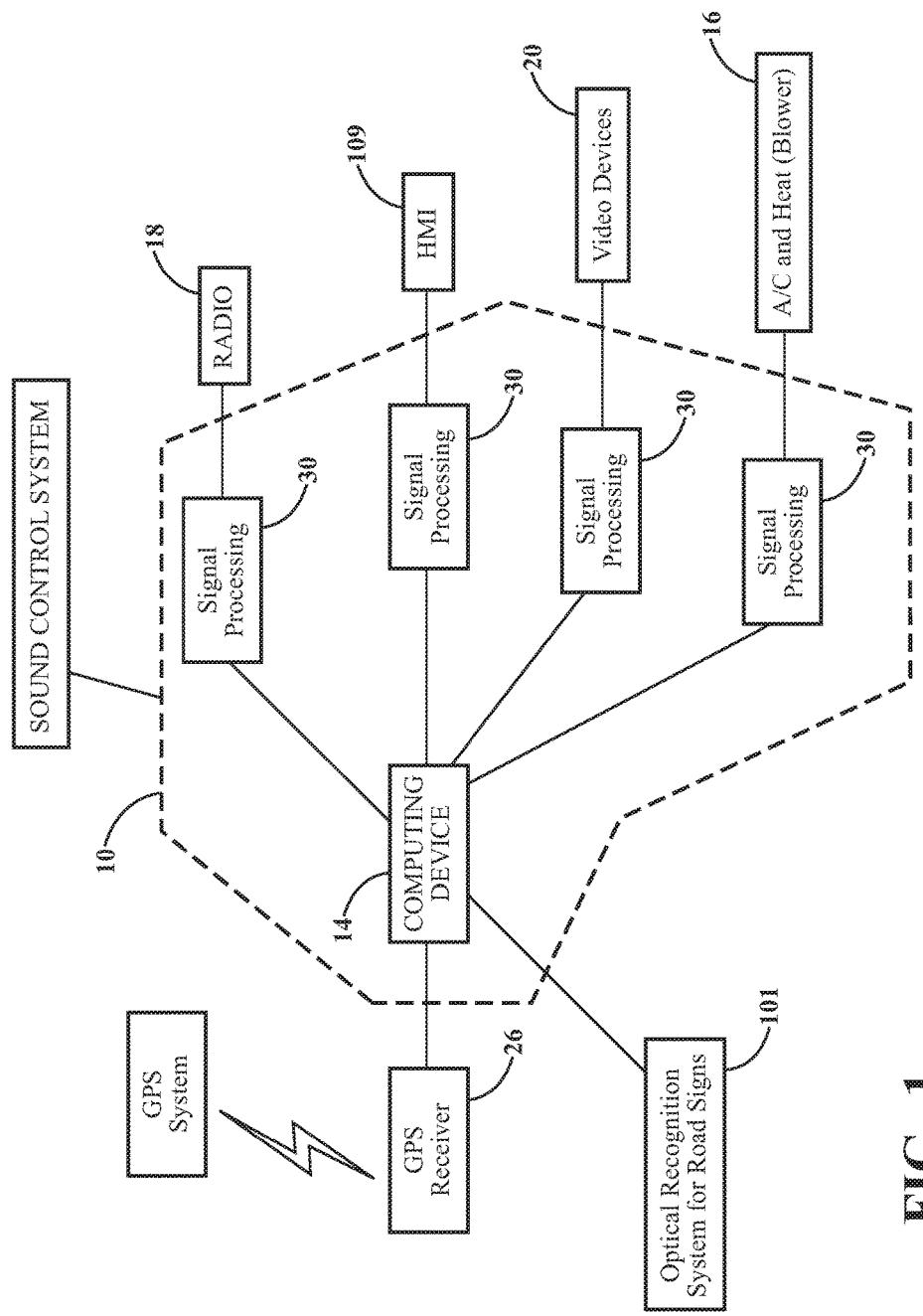
FIG. 1 is a block diagram of one embodiment of a position-based vehicle interior sound control system 10.

FIG. 1 shows a block diagram of one embodiment of a position-based vehicle interior sound control system 10. System 10 is configured for controlling various vehicle systems and/or components which generate sounds heard inside the vehicle occupant compartment. Examples of such systems and/or components include the blower(s) 16 used for the HVAC system, the car stereo 18, video devices 20 such as DVD players, any human-vehicle audio interfaces 109, and any other vehicle-generated sources of sounds heard in the occupant compartment.

Figure 2:
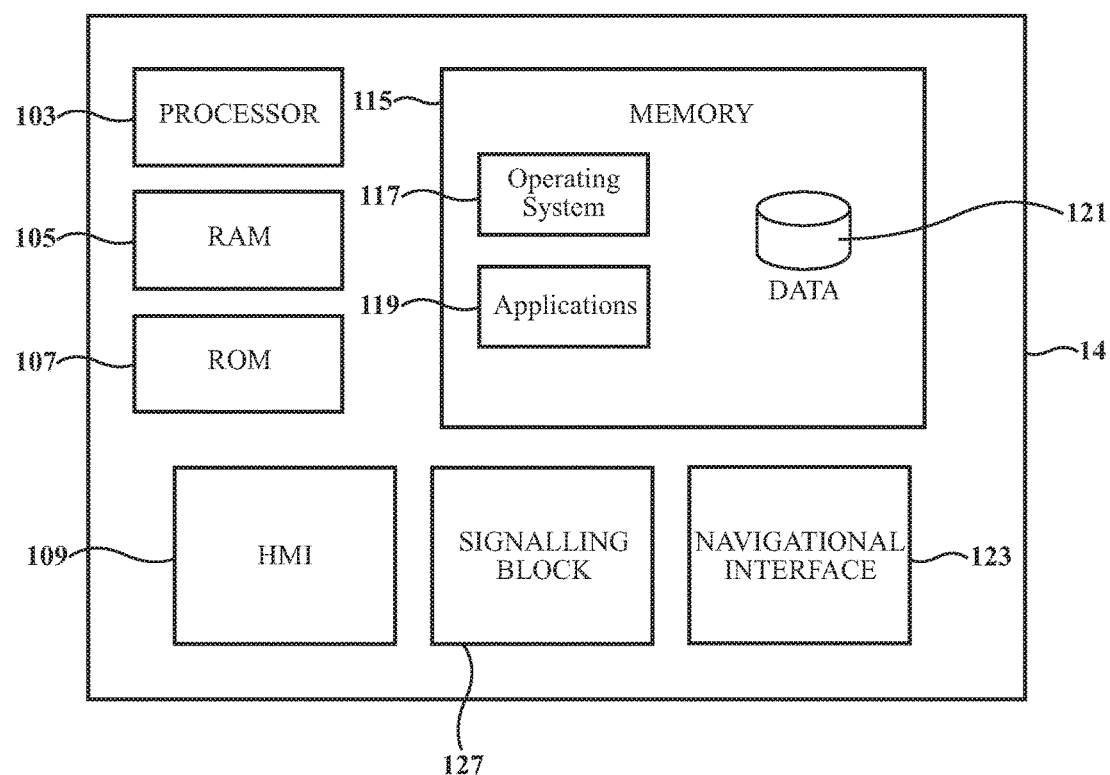
FIG. 2 is a block diagram of a computing device in a position-based vehicle interior sound control system according to one or more illustrative embodiments of the disclosure.

FIG. 2 illustrates a block diagram of a computing device 14 in a position-based vehicle interior sound control system according to one or more illustrative embodiments of the disclosure. The computing device 14 may have one or more processors 103 for controlling overall operation of the device 14 and its associated components, including RAM 105, ROM 107, input/output module or HMI (human machine interface) 109, memory 115 and any additional elements, such as navigational interface 123, control signaling block 127, and any other associated elements.

Input/Output (I/O) 109 may include a microphone, keypad, touch screen, and/or stylus through which a user of the computing device 14 may provide input, and may also include one or more of a speaker for providing audio output and a video display device for providing textual, audiovisual and/or graphical output. Software may be stored within memory 115 and/or other suitable storage to provide instructions to processor 103 for enabling device 14 to perform various functions. For example, memory 115 may store software used by the device 14, such as an operating system 117, application programs 119, and an associated internal database 121. Processor 103 and its associated components may enable the sound control system 10 to execute a series of computer-readable instructions directed to performing the various functions and operations described herein. Computing device 14 is also configured (for example, using a suitable navigational interface 123) for operative communication with a navigation system (for example, through a GPS device 26) for the purposes described herein. Computing device 14 is configured to receive current or updated vehicle location information (such as GPS coordinates) from the navigation system. For purposes of description herein, the locations of the vehicle and designated "quiet" spots will be discussed in terms of GPS coordinates provided by a GPS system. However, it will be understood that vehicle and "quiet" spot location information and other navigation information used for the purposes described herein may be in any suitable alternative form.

As used herein, the term "quiet location" refers to a geographical location where it is deemed desirable to reduce the volume(s) of vehicle-generated sounds within the vehicle occupant compartment, or to eliminate such sounds. Also, references herein to the vehicle "interior" refer to the occupant compartment where the driver and passengers reside during normal vehicle operation.

Computing device 14 is also configured to continuously compare the current vehicle GPS coordinates with the GPS coordinates of various "quiet" locations. Coordinates or location information relating to the "quiet" locations may be stored in memory 115. In one embodiment, computing device 14 is also configured for generating (through control signaling block 127) sound control signals designed to operate various sound-producing vehicle systems and/or components so as to reduce the sound levels produced by those systems responsive to a current location of the vehicle. In one embodiment, signal generation and transmission are performed by a signaling block 22 controlled by the processor and incorporated into the computing device.

Figure 4:
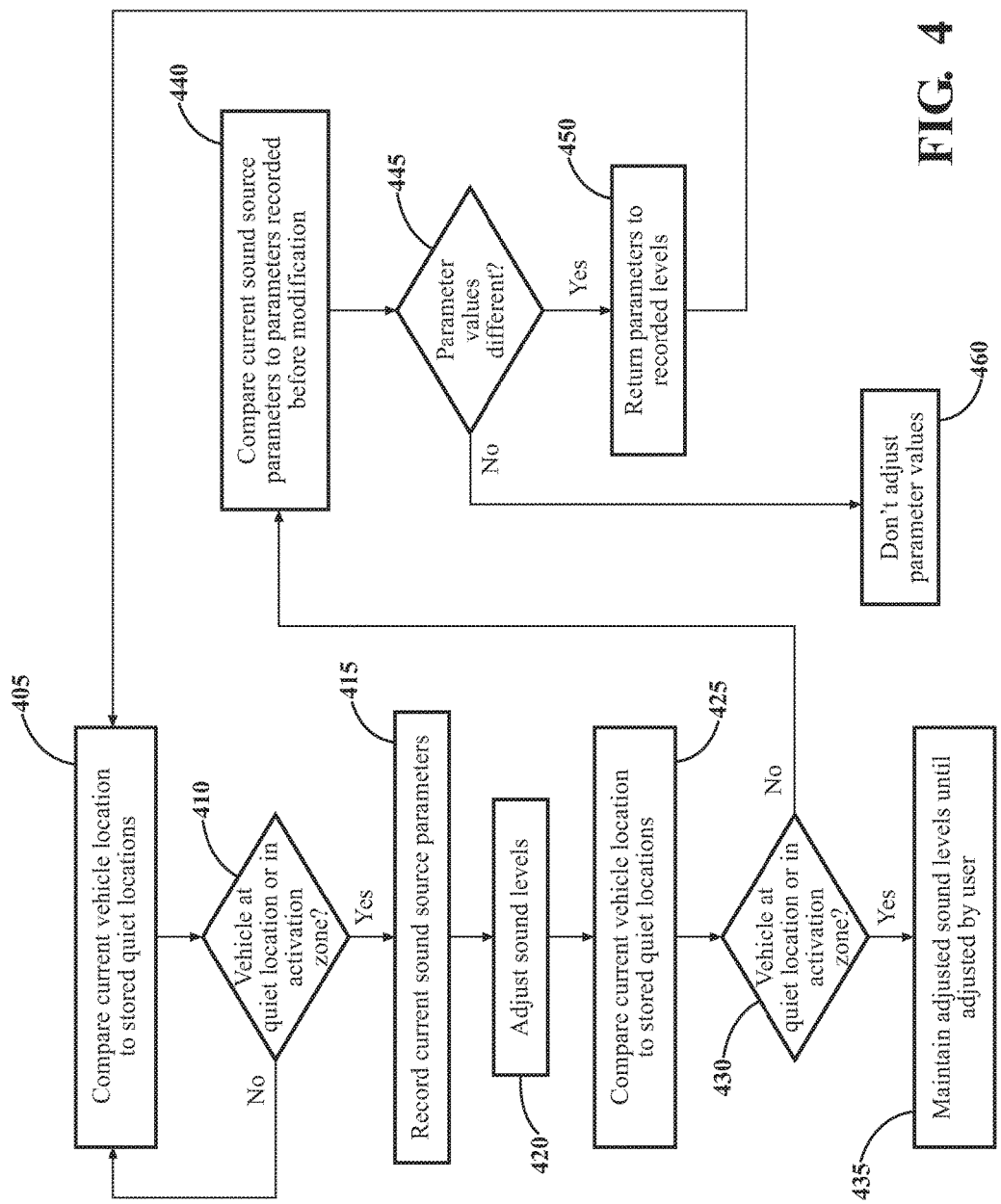
FIG. 4 is a flow diagram illustrating operation of one embodiment of an interior sound control system as described herein.

In a particular embodiment, computing device 14 is also configured to record the current control settings, power settings or other pertinent control parameters of the sound source prior to adjusting the sound levels for the "quiet" location. In this embodiment, computing device 14 is also configured return the sound source to the pre-"quiet" location parameter levels after the vehicle is no longer in proximity to the "quiet" location. For example, if the vehicle enters a "quiet" location, prior to adjusting the stereo volume for the quiet location, the computing device may save to memory control parameter values settings corresponding to the current stereo volume. After the vehicle leaves the "quiet" location, the computing device may then reference the stored control settings and return the stereo volume to its previous level. This process may be executed with multiple sound sources simultaneously. This process is illustrated in FIG. 4.

Depending on the controlled system or device and method of control, control signals generated by the computing device may require processing in order to operate the controlled system or device in the manner desired. For such cases, suitable signal processing means 30 may be included in system 10. Suitable signal processing means 30 may be incorporated into the signaling block or otherwise into the computing device 14, into the controlled system or device itself, or (as shown in FIG. 1) located along the signal path between the computing device 14 and the controlled system or device.

In one embodiment, computing device 14 is configured for operative communication with the various vehicle sound sources 16, 18, 20, 109 meeting the criteria described herein, and incorporates all the hardware and software needed to generate and transmit the control signals necessary to effect control of the sound levels produced by the various sound-producing systems and/or components. Alternatively, the hardware and/or software for such purposes as control signal generation, transmission and interfacing with the sound-producing vehicle systems and/or components may be physically separate from and in communication with the computing device, and may be activated to generate and transmit the desired control signals responsive to a command signal provided by the computing device.

Computing device 14 may be operatively coupled to any of sound sources 16, 18, 20, 109 using any suitable method (for example, wirelessly, through individual dedicated wired connections as shown in FIG. 1, or via a controller bus in a manner known in the art). In a particular embodiment, computing device 14 is incorporated into a sound control module (not shown) configured for performing all the navigational interface, computing, and signal generation and transmission functions described herein.

Navigation system receiver 26 (for example, a GPS receiver or device) is in operative communication with computing device 14 and provides vehicle location information to the computing device. GPS device 26 may be a known GPS device configured for communication with a GPS satellite system. Device 26 may be embodied in a known GPS receiver separate from computing device 22 and configured for wired or wireless communication with computing device 14. In a manner known in the art, device 26 receives current coordinates of the vehicle. In an alternative embodiment, the navigation system interface or GPS device is incorporated into the computing device and is configured for operative communication with the other elements of the computing device.

In a particular embodiment, a user may add or delete "quiet" locations using HMI 109. For example, when the vehicle is onsite at a location not currently stored in the "quiet" location list, the user may activate an option on the interface 109 to update the "quiet" locations. The interface may then ask the user if they want to enter the current location as a "quiet" location. The coordinates of the current location may then be saved in the "quiet" location list. In the same manner, the interface may be operated to delete currently saved "quiet" locations from a list.

Figure 3:
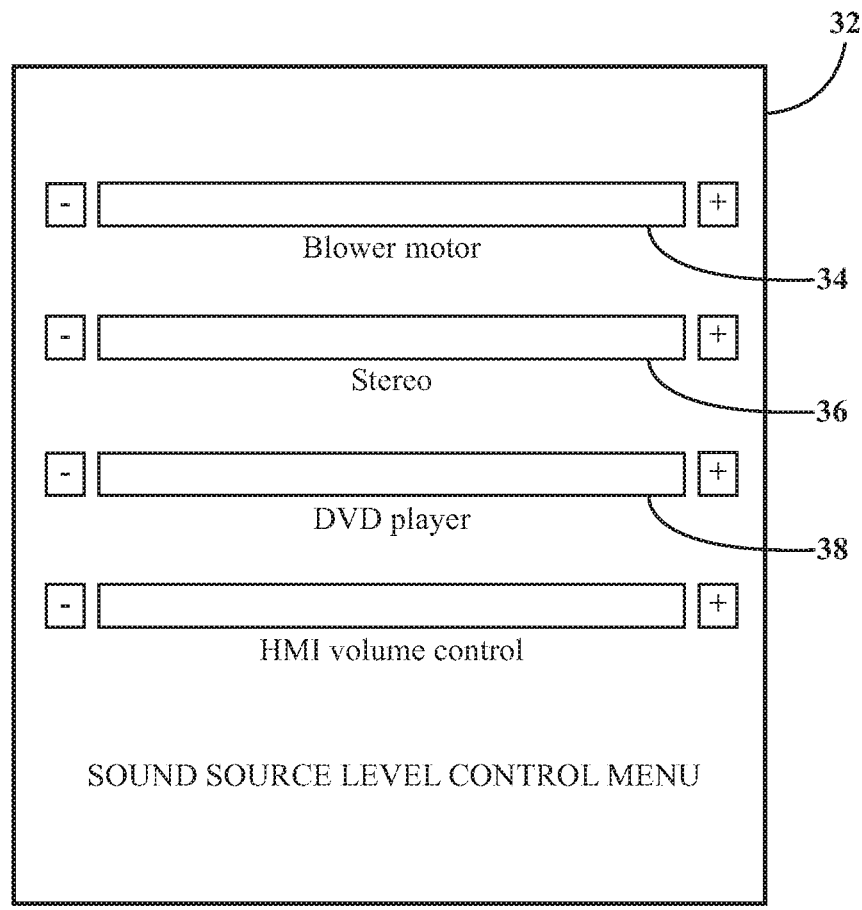
FIG. 3 is a schematic diagram of a touch-screen display with interactive menu bars usable for controlling interior sound levels, in accordance with an embodiment described herein.

In a particular embodiment, HMI 109 is configured to enable a user to control each sound source individually. The user may also elect to control all sound sources simultaneously. Referring to FIG. 3, in one example, HMI 109 includes a touch-screen display 32 with interactive menu bars 34, 36, 38, 40 indicating the extent of the sound level available for each sound source. A user may activate the sound source in question and then adjust the menu bar for the corresponding sound source (for example, by sliding a finger along the menu bar in a known manner) until the desired "quiet" level for that sound source is reached. Because the screen 32 is interactive, sound levels produced by the sound source are adjusted simultaneously with user operation of the touch screen, so that the user actually hears what the revised sound level will sound like. The selected sound levels may then be saved for implementation when the vehicle is in a "quiet" location.

In a particular embodiment, system 10 and HMI 109 may be configured to enable a user to establish a user-defined activation radius or zone around any specified "quiet" location coordinates. The control system will then control the vehicle interior sounds in the manner described herein whenever the vehicle enters this activation zone. For example, a user may establish as an activation zone a radius of 100 feet surrounding the GPS coordinates of a local school. In this case, the vehicle interior sound sources would be controlled as specified by the user whenever the vehicle approaches to within 100 feet of the designated coordinates.

The user may also be enabled to establish an activation radius or zone around other "quiet" location coordinates where the vehicle does not currently reside. Such coordinates may be shown on an interactive display or otherwise presented to the user, along with appropriate menu options enabling specification of activation zone size and/or other parameters.

The addresses or GPS coordinates of the "quiet" locations where the vehicle internals sounds are to be modulated may be stored in a computing device memory. In an alternative embodiment, coordinates of the "quiet" locations are stored on the GPS device 26. The GPS device may be configured for comparing the current vehicle coordinates to the "quiet" location coordinates. If the coordinates match (within a certain tolerance zone provided for some positional mismatch), the GPS device transmits a signal to the computing device informing the computing device that the vehicle is in a designated "quiet" location, and that appropriate sound control signals should be generated by the computing device 14.

Alternatively, certain coordinates may be flagged designated as "quiet" locations on GPS maps stored in the GPS device 26 or at another location. The GPS maps may be updated remotely or by a user in a known manner. The GPS device 26 may also be configured to continuously compare the current vehicle position with the list of "quiet" coordinates, and to signal the computing device 14 when a match is found, and to send a message notifying computing device 14 when a match occurs. The GPS device 26 may also include a user interface enabling a user to add or delete "quiet" locations in a manner similar to that used in updating coordinates stored on computing device.

The sound sources 16, 18, 20, 109 controlled by the sound control system generate sounds heard within or directed primarily to the vehicle interior. A stated previously, examples of such sound sources include vehicle media devices (such as radios and built-in DVD players), HMI audio, air conditioning and heater blowers and any other similar device or system.

The various sound control signals sent from the sound control system 10 to the sound sources 16, 18, 20, 109 are designed to reduce the volumes of sounds produced by the sources while the vehicle resides within a "quiet" location. The sound volumes may be controlled by any suitable method or methods, for example, by electronically regulating the power provided to the sound source. For example, the sound volume of the blower for the air conditioning and heating system may be reduced by controlling power to the blower motor so as to reduce blower speed. In addition, additional actuators or other devices may be operatively coupled to the sound sources if needed to effect the desired control commands. If the sound control system is built into the vehicle during manufacture, any circuitry, software and/or actuators needed for control of the sound sources as described herein may also be built into the vehicle.

Control signals and devices used to control vehicle interior sounds may be configured to operate in parallel with existing control mechanisms (for example, manually-operated controls such as potentiometers, levers, etc.). This enables control over the sound sources to be exercised by either the sound control system or a user, thereby enabling the user to override system control of the sound sources if desired.

Generally, locations are designated as "quiet" locations based on a desire or need to enable vehicle occupants to more clearly or readily hear sounds outside the vehicle, or to temporarily minimize distractions caused by sounds within the vehicle occupant compartment, thereby enabling the driver or other vehicle occupant to focus more closely on the vehicle surroundings in the "quiet" location. Examples of locations which a user may wish to designate "quiet" locations include schools, hospitals, and localized areas with a constant, high density of pedestrian and/or vehicle traffic, such as restaurant and strip mall parking lots. Other possible "quiet" locations include locations at which railroad tracks cross the road. In such a case, it may be desirable for the driver to listen more carefully to sounds exterior of the vehicle or otherwise to focus more attention outside the vehicle, to maximize the chances of detecting an approaching train. Location information relating to railroad crossings is readily available from existing GPS maps.

In a particular embodiment, in a vehicle incorporating an optical recognition system 101, the optical system may be configured to recognize railroad crossing signs. In this embodiment, the computing device 14 may be configured to control the vehicle interior sound levels responsive to recognition of a railroad crossing sign on the road on which the vehicle is driving. This is another form of location-based sound level control, in that the control is based upon proximity of the vehicle to the railroad tracks indicated by the road sign. The sound control system may be configured to flag as a "quiet" location navigation information relating to any railroad crossings that are new or are not currently saved in the "quiet" location list.

Other possible "quiet" locations include locations such as drive-throughs at banks, coffee shops and fast food restaurants, for example, where interaction takes place with people outside the vehicle. Location information relating to commercial establishments such as these is readily available from existing GPS maps.

FIG. 4 shows a flow diagram illustrating operation of one embodiment of the sound control system described herein. As stated previously, computing device 14 is configured to continuously compare the current vehicle GPS coordinates with the GPS coordinates of various "quiet" locations.

In block 405, computing device compares the current location to stored "quiet" locations.

In block 415, if the vehicle is at a "quiet" location or within an activation zone surrounding the "quiet" location, and prior to adjusting the sound levels, the computing device saves the current sound source parameters in memory. For example, the current stereo volume level may be saved in memory for re-adjustment of the stereo after the vehicle leaves the quiet location. Alternatively, if the vehicle is not at a "quiet" location or within an activation zone, the computing device continues the coordinate comparisons in block 405.

In block 420, after saving the current sound source parameters, the computing device operates the vehicle internal sound sources so as to adjust the sound levels.

In block 425, the computing device again compares the current location to stored "quiet" locations to determine if the vehicle still resides at a "quiet" location or within an activation zone surrounding the "quiet" location.

In block 435, if the vehicle still resides at a "quiet" location or within an activation zone surrounding the "quiet" location, the computing device maintains the sound levels ate the adjusted or "quiet" location levels until these level(s) are changed by a user.

In block 440, if the vehicle no longer resides at a "quiet" location or within an activation zone surrounding the "quiet" location, the computing device compares the current (i.e., adjusted) sound source parameters to the recorded (i.e., pre-"quiet" zone) parameters.

In block 450, if the current parameters are different from the recorded parameters, the computing device returns the parameter values to the recorded levels.

In block 460, if the current parameters are not different from the recorded parameters, the parameters values are left unchanged.

The above procedure can be co-opted or interrupted at any time using manual control of the sound source parameters (for example, by manually adjusting the stereo volume). In a particular embodiment, a user may decide that conventional or manual interior sound control is to be overridden while the vehicle is within a "quiet" location or within an activation zone surrounding the "quiet" location, and until the vehicle leaves the designated "quiet" location or activation zone. A user may also decide that conventional or manual interior sound control is to be overridden while the vehicle is within a "quiet" location or within an activation zone surrounding the "quiet" location, and until the user actively asserts manual or conventional control in a known manner. System 10 and HMI 109 may be configured to offer selection of such operational modes, for example, by operating a touch screen to enable or disable one or more of the modes.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device for a vehicle interior sound control system, the computing device comprising:
   one or more processors for controlling operation of the computing device, and
   a memory for storing data and program instructions usable by the one or more processors, wherein the one or more processors are configured to execute instructions stored in the memory to operate, responsive to a location of the vehicle, at least one portion of the vehicle so as to:
   control a sound level in an interior of the vehicle produced by the at least one portion of the vehicle; and
   to operate a user interface so as to enable a user to add a location at which the at least one portion of the vehicle is to control the sound level produced by the at least one portion of the vehicle, and save the added location into a memory of the sound control system.

2. A vehicle interior sound control system including a computing device in accordance with claim 1.

3. A vehicle including a computing device in accordance with claim 1.

4. The computing device of claim 1 further comprising a navigation system interface in operative communication with other elements of the computing device.

5. The computing device of claim 1 wherein the one or more processors are configured to execute instructions stored in the memory to:
   compare a current location of the vehicle to a set of "quiet" locations; and
   responsive to a presence of the vehicle at or within a predetermined distance from one of the "quiet" locations, operate the at least one portion of the vehicle so as to control the sound level produced by the at least one portion of the vehicle.

6. The computing device of claim 5 wherein the set of "quiet" locations is stored in a memory on the computing device.

7. The computing device of claim 6 wherein the set of "quiet" locations is stored in a memory on a navigation system.

8. The computing device of claim 7 wherein a navigation system is in communication with the computing device, and wherein the navigation system is configured to:
   compare the current location of the vehicle to a set of "quiet" locations; and
   responsive to a presence of the vehicle at or within a predetermined distance from one of the "quiet" zone locations, communicate a message to the computing device that the vehicle is at or within a predetermined distance from one of the "quiet" locations.

9. The computing device of claim 5 wherein the one or more processors are configured to execute instructions stored in the memory to store pertinent control parameters of the at least one portion of the vehicle prior to operating the at least one portion of the vehicle so as to control the sound level produced by the at least one portion of the vehicle.

10. The computing device of claim 9 wherein the one or more processors are configured to execute instructions stored in the memory to, after the vehicle is no longer at or within a predetermined distance from one of the "quiet" locations, return the at least one portion of the vehicle to the stored pertinent control parameters.

11. A sound control system including a computing device in accordance with claim 9.

12. The computing device of claim 1 wherein the one or more processors are configured to execute instructions stored in the memory to operate a user interface so as to enable a user to delete from a memory of the sound control system a location at which the at least one portion of the vehicle is to control the sound level produced by the at least one portion of the vehicle.

13. The computing device of claim 1 wherein the vehicle includes a plurality of portions capable of producing sound within the vehicle interior, and wherein the one or more processors are configured to execute instructions stored in the memory to operate a user interface so as to enable a user to select, for the at least one portion of the vehicle to be controlled to control the sound level, a desired sound level for the at least one portion of the vehicle when the at least one portion of the vehicle is operated by the computing device so as to control the sound level produced by the at least one portion of the vehicle.

14. A computing device for a vehicle interior sound control system, the computing device comprising:

one or more processors for controlling operation of the computing device, and a memory for storing data and program instructions usable by the one or more processors, wherein the one or more processors are configured to execute instructions stored in the memory to operate, responsive to a location of the vehicle, at least one portion of the vehicle so as to control a sound level in an interior of the vehicle produced by the at least one portion of the vehicle, wherein the one or more processors are configured to execute instructions stored in the memory to operate a user interface so as to enable a user to establish an activation zone around a specified location where control of the sound level by the computing device will be implemented.

15. A computing device for a vehicle interior sound control system, the computing device comprising:

one or more processors for controlling operation of the computing device, and a memory for storing data and program instructions usable by the one or more processors, wherein the one or more processors are configured to execute instructions stored in the memory to:

operate, responsive to a location of the vehicle, at least one portion of the vehicle so as to control a sound level in an interior of the vehicle produced by the at least one portion of the vehicle; and operate a user interface so as to enable a user to specify that manual control of the sound level produced by the at least one portion of the vehicle is to be overridden by the sound control system until the vehicle leaves the designated location.

16. A computing device for a vehicle interior sound control system, the computing device comprising:

one or more processors for controlling operation of the computing device, and a memory for storing data and program instructions usable by the one or more processors, wherein the one or more processors are configured to execute instructions stored in the memory to:

operate, responsive to a location of the vehicle, at least one portion of the vehicle so as to control a sound level in an interior of the vehicle produced by the at least one portion of the vehicle; and operate a user interface so as to enable a user to specify that manual control of the sound level produced by the at least one portion of the vehicle is to be overridden by the sound control system until a user actively asserts manual control over the sound level produced by the at least one portion of the vehicle.

\* \* \* \* \*